(12) United States Patent
Vajravel (10) Patent No.: US 9,992,236 B2
(45) Date of Patent: Jun. 5, 2018

(54) SYSTEMS AND METHODS FOR PROVIDING PROTOCOL INDEPENDENT DISJOINT PORT NAMES (71) Applicant: Dell Products L.P., Round Rock, TX (US)

(72) Inventor: Gokul Thiruchengode Vajravel, Namakkal (IN)

(73) Assignee: Dell Products L.P., Round Rock, TX (US)

( * ) Notice: Subject to any disclaimer, the term of this patent is extended or adjusted under 35 U.S.C. 154(b) by 231 days.

(21) Appl. No.: 14/746,258

(22) Filed: Jun. 22, 2015

(65) Prior Publication Data
US 2016/0373488 A1 Dec. 22, 2016

(51) Int. Cl.
*H04L 29/06* (2006.01)
*G06F 13/20* (2006.01)
*G06F 12/00* (2006.01)

(52) U.S. Cl.
CPC .......... *H04L 65/1066* (2013.01); *G06F 12/00* (2013.01); *G06F 13/20* (2013.01)

(58) Field of Classification Search
CPC ................ H04L 65/1066; H04L 65/1056
USPC .......................................... 709/217
See application file for complete search history.

(56) References Cited

U.S. PATENT DOCUMENTS

| 6,606,660 | B1 * | 8/2003 | Bowman-Amuah | H04L 65/602 709/227 |
| 7,010,607 | B1 * | 3/2006 | Bunton | H04L 1/24 709/228 |
| 7,051,198 | B2 * | 5/2006 | Cabrera | G06F 3/0607 707/999.202 |
| 7,082,598 | B1 * | 7/2006 | Le | G06F 9/4413 703/21 |
| 8,149,771 | B2 * | 4/2012 | Khivesara | H04L 12/1881 370/230 |
| 8,166,175 | B2 * | 4/2012 | Schmieder | H04L 67/14 709/217 |
| 8,675,553 | B2 * | 3/2014 | Song | H04L 12/185 370/310 |
| 2005/0091658 | A1 * | 4/2005 | Kavalam | G06F 21/31 718/104 |
| 2005/0270270 | A1 * | 12/2005 | Chadha | G06F 3/0237 345/157 |

(Continued)

OTHER PUBLICATIONS

Berners-Lee et al., "Uniform Resource Identifier (URI): Generic Syntax", RFC 3986, 2005.*

(Continued)

*Primary Examiner* — Ondrej C. Vostal
(74) *Attorney, Agent, or Firm* — Baker Botts L.L.P.

(57) ABSTRACT

A system and method for providing protocol independent disjoint port names for a session level restriction enabled information handling system utilizes a virtual USB device created at a host server when an input/output device is coupled to a remote client device. A symbolic link in global namespace is associated with the virtual USB device. If the symbolic link in global namespace begins with either "COM" or "LPT," the symbolic link in global namespace is deleted and replaced with a port name symbolic link in user-session namespace based, at least in part, on the currently available port index in the user-session namespace.

20 Claims, 4 Drawing Sheets

(56) References Cited

U.S. PATENT DOCUMENTS

| | | | |
|---|---|---|---|
| 2006/0033944 A1* | 2/2006 | Kadota | G06F 3/1207 358/1.13 |
| 2006/0069750 A1* | 3/2006 | Momtchilov | H04L 67/08 709/219 |
| 2006/0075105 A1* | 4/2006 | Momtchilov | G06F 9/4413 709/227 |
| 2006/0277275 A1* | 12/2006 | Glaenzer | H04L 67/125 709/219 |
| 2007/0136391 A1* | 6/2007 | Anzai | G06F 17/30197 |
| 2007/0245008 A1* | 10/2007 | Matsui | H04L 67/322 709/223 |
| 2008/0201701 A1* | 8/2008 | Hofhansl | G06F 8/60 717/168 |
| 2009/0007161 A1* | 1/2009 | Sheehan | G06F 17/301 719/331 |
| 2009/0164659 A1* | 6/2009 | Hoshino | H04L 47/10 709/235 |
| 2009/0172776 A1* | 7/2009 | Makagon | H04L 9/321 726/2 |
| 2009/0320115 A1* | 12/2009 | Dean | H04L 63/105 726/8 |
| 2009/0327301 A1* | 12/2009 | Lees | G06F 17/30011 |
| 2010/0043072 A1* | 2/2010 | Rothwell | G06F 21/566 726/24 |
| 2010/0095122 A1* | 4/2010 | Bettger | H04L 12/1831 713/170 |
| 2011/0153697 A1* | 6/2011 | Nickolov | G06F 9/4856 707/827 |
| 2012/0059989 A1* | 3/2012 | Hamaguchi | G06F 3/061 711/114 |
| 2012/0331534 A1* | 12/2012 | Smith | G06F 21/41 726/6 |
| 2013/0111561 A1* | 5/2013 | Kaushik | H04L 63/105 726/4 |
| 2014/0006465 A1* | 1/2014 | Davis | G06F 17/30194 707/827 |
| 2014/0007239 A1* | 1/2014 | Sharpe | G06F 21/561 726/24 |
| 2014/0040470 A1* | 2/2014 | Kaushik | H04L 63/105 709/225 |
| 2016/0036818 A1* | 2/2016 | Patesaria | H04L 63/104 726/3 |
| 2016/0055188 A1* | 2/2016 | Goel | G06F 17/277 707/741 |

OTHER PUBLICATIONS

LookinAround, "Understanding Device Drivers and Filters", 20009.*
Merriam-Webster, "processor", 2017.*
Microsoft, "Controlling Device Namespace Access", 2017.*
Microsoft, "IoCreateDevice routine", 2017.*
Podobry, "File System Filter Driver Tutorial", 2015.*
Ponemon Institute, "The State of USB Drive Security", 2011.*
Apievangelist, "Systems and methods for providing protocol independent disjoint device letter sets", 2015.*
IEEE 100 The Authoritative Dictionary of IEEE Standards and Terms, 7th Edition, 2000, p. 872.*
Microsoft, "COM Port Datasbase", 2017.*
Microsoft, "ComDBGetCurrentPortUsage function", 2017.*
Microsoft, "External Naming of COM Ports", 2017.*

* cited by examiner

SYSTEMS AND METHODS FOR PROVIDING PROTOCOL INDEPENDENT DISJOINT PORT NAMES

TECHNICAL FIELD

This disclosure relates generally to information handling systems and, more particularly, to protocol independent systems and methods for providing disjoint port names for session isolated devices connected by users in a multi-user environments.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

A thin client, or as it is sometimes referred to a lean client or a slim client, is an information handling system or an executable software program running on an information handling system. A thin client generally relies on another information handling system, such as a server, to fulfill at least some of the requested computational roles. For example, a user can access applications or other computational support services from a server by logging into the server from a thin client, for example, a terminal device. Multiple users may log into the same server from multiple terminal devices and may simultaneously request services from the server.

For some legacy devices, the serial and parallel ports are deprecated and may not be available to more modern information handling systems. For example, in modern information handling systems the common hardware interface may be a Universal Serial Bus (USB). To support the deprecated ports of the legacy information handling systems, some vendors implement converters that create appropriate port names (or symbolic links) to permit modern applications to access more recent devices, for example, devices that use only USB as an interface. In this manner, legacy devices may be used with modern information handling systems. For example, legacy barcode scanners, credit card swiping machines, credit card skimmers and other legacy devices known to one of ordinary skill in the art may be accessed by modern information handling systems.

However, one difficulty with implementing converters is the limitation on the number of devices that may be accessed. Because each user is assigned a different port for each accessed device, the number of devices the user is attempting to access may exceed the number recognizable by legacy information handling systems. For example, in a multi-user environment with USB redirection/virtualization, when several users connect and redirect USB serial/parallel port devices, the port name assignments may easily exceed the maximum recognizable number of ports (for example, COM 8 or LPT 8) leaving the user unable to access the desired devices.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a facsimile machine, a printer, keyboard, a mouse, a wireless device, a video display, and any other I/O device known to one of ordinary skill in the art. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-5, wherein like numbers are used to indicate like and corresponding parts.

Figure 1:
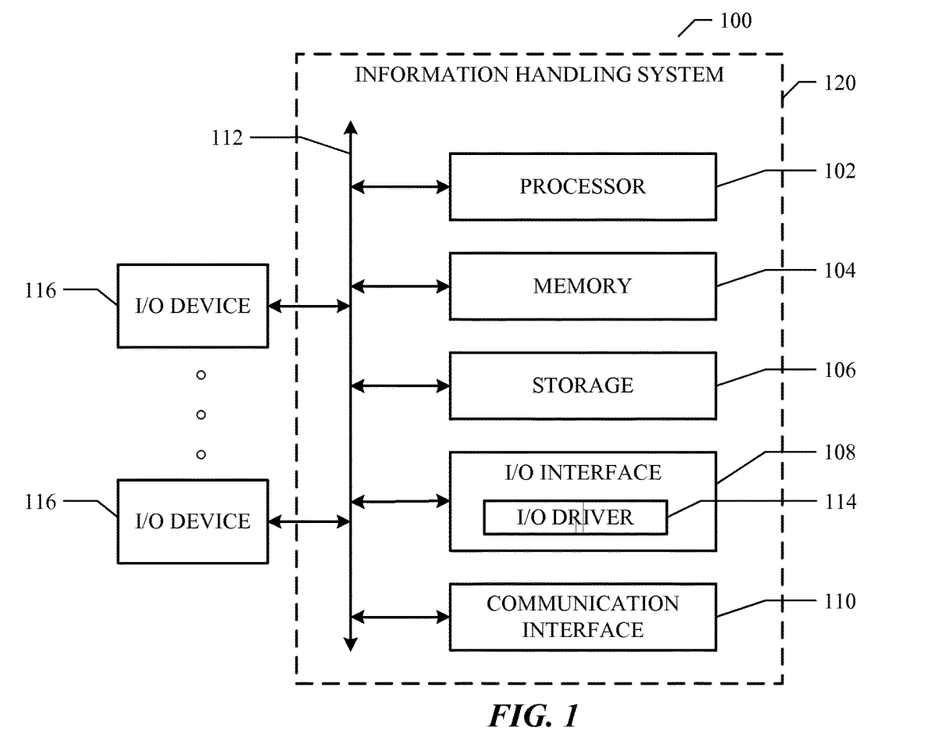
FIG. 1 is a block diagram of selected elements of an information handling system.

FIG. 1 illustrates an example information handling system configuration 100 in accordance with an aspect of the present disclosure. In particular embodiments, one or more information handling systems 120 perform one or more steps of one or more methods described or illustrated herein. In particular embodiments, one or more information handling systems 120 provide functionality described or illustrated herein. In particular embodiments, software running on one or more information handling systems 120 performs one or more steps of one or more methods described or illustrated herein or provides functionality described or illustrated herein. Particular embodiments include one or more portions of one or more information handling systems 120. Herein, reference to an information handling system, such as information handling system 120, may encompass a computing device, and vice versa, where appropriate. Moreover, reference to an information handling system 120 may encompass one or more information handling systems 120, where appropriate.

This disclosure contemplates any suitable number of information handling systems 120. This disclosure contemplates information handling system 120 taking any suitable physical form. As example and not by way of limitation, information handling system 120 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, a terminal, a thin client, a slim client, a lean client, or a combination of two or more of these. Where appropriate, information handling system 120 may include one or more information handling systems 120; be unitary or distributed; span multiple locations; span multiple machines; span multiple data centers; or reside in a cloud, which may include one or more cloud components in one or more networks. Where appropriate, one or more information handling systems 120 may perform without substantial spatial or temporal limitation one or more steps of one or more methods described or illustrated herein. As an example and not by way of limitation, one or more information handling systems 120 may perform in real time or in batch mode one or more steps of one or more methods described or illustrated herein. One or more information handling systems 120 may perform at different times or at different locations one or more steps of one or more methods described or illustrated herein, where appropriate.

In particular embodiments, information handling system 120 includes a processor 102, memory 104, storage 106, an input/output (I/O) interface 108, a communication interface 110, a bus 112, and an I/O driver 114. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 120 may load instructions from storage 106 or another source (such as, for example, another information handling system 120) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 120 and one or more I/O devices 116. Information handling system configuration 100 may include one or more of these I/O devices 116, where appropriate. In particular embodiments, the I/O device 116 may be a device with a USB interface, a serial port interface, a parallel port interface, or a combination thereof. One or more of these I/O devices 116 may enable communication between a user and information handling system 120. As an example and not by way of limitation, an I/O device 116 may include a keyboard, keypad, microphone, monitor, mouse, printer, scanner, speaker, still camera, stylus, tablet, touch screen, trackball, video camera, another suitable I/O device 116 or a combination of two or more of these I/O devices 116. An I/O device 116 may include one or more sensors. This disclosure contemplates any suitable I/O devices 116 and any suitable I/O interfaces 108 for them. Where appropriate, I/O interface 108 may include one or more I/O drivers (such as device or software) drivers 114 enabling processor 102 to drive one or more of these I/O devices 116. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both for providing one or more interfaces for communication (such as, for example, packet-based communication) between information handling system 120 and one or more other information handling systems 120 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 120 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 120 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
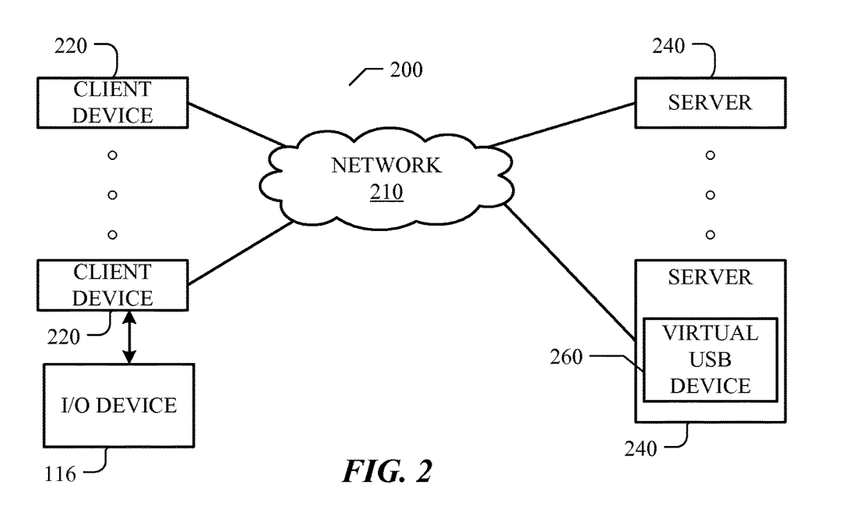
FIG. 2 is an example of a network environment.

FIG. 2 illustrates an example configuration of networked information handling systems generally at 200 including client devices 220 and servers 240. In particular embodiments, client devices 220 and servers 240 may be any one or more of the information handling systems 120 as previously described. In particular embodiments, one or more client devices 220 and one or more servers 240 are connected via network 210 to form a multi-user environment. Network 210 may be a public network or a private (for example, corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (for example, a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. In particular embodiments, client device 220 may be coupled to an I/O device 116. Client device 220 may couple to I/O device 116 via a wired or wireless connection or by any manner known to one of ordinary skill in the art. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system. As an example, a private (for example, corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220. In particular embodiments, a server 240 may include a virtual USB device 260 that has the same properties as the I/O device 116 of client 220 as discussed with respect to FIG. 3.

It may be desirable, in the case of a private (for example, corporate) network including multiple sites or subnets to deploy software (including, for example, all or part of one or more operating systems, applications, add-ons, or data) to one or more client devices 220 across one or more sites or subnets. The client devices 220 may, for example, be located remotely from one or more servers 240 (including, for example, device managers or resource repositories.

In particular embodiments, one or more servers 240 of a network 210 may include a device manager that may manage one or more client devices 220 (for example, thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (for example, automatically) device discovery, tracking of assets (for example, hardware or software inventory) at client devices, monitoring the status or health of client devices, applying one or more policies to client devices (including, for example, network settings of the client devices), or remote administration and shadowing of client devices. The device manager may deliver any suitable resources including, for example, operating systems, add-ons, content, or any other suitable data, applications, or images to one or more client devices 220 of network 210.

In particular embodiments, client device 220 (for example, a thin client, a slim client, or a lean client) or one or more software components associated with client device 220 may depend on server 240 to fulfill its computational roles. As an example of a Virtual Desktop Infrastructure (VDI) and not by way of limitation, client device 220 may provide one or more terminal services to one or more users of client device 220. Reference to client device 220 and to a user of client device 220 should be understood in the singular as well as the plural. For example, client device 220 may refer to one or more client devices. Any given client device 220 may have one or more users associated with that client where each user has access to one or more I/O devices 116 coupled to the client device 220. One or more users of one or more client devices 220 may login to the same server 240 and perform tasks on the same server 240 substantially at the same time. In the VDI, one or more I/O devices may be connected to client device 220. In particular embodiments, in order for the I/O devices to work seamlessly, communications associated with the I/O devices may be redirected to a Virtual Desktop (VD) operating system (OS) or a Virtual Machine (VM) OS (for example, WINDOWS SERVER 2003) of the VDI. Furthermore, communications for one or more of the I/O devices may be restricted (for example, limited) only to a particular user-session, as in session-level-restriction (SLR) or session-isolation.

Session level restriction for a device may be implemented for many types of I/O devices 116 such as for example, printers, scanners, and storage devices (for example, mass storage, pen drive, hard drive, compact disc (CD), digital video disc (DVD), and BLU-RAY disc, or any other devices known to one of ordinary skill in the art). As an example and not by way of limitation, SLR may be implemented for an I/O device 116 that is being operated by a current user or a current user session in a VM OS. In particular embodiments, a third-party kernel filter driver may be layered (or loaded) on top of every device class of the I/O device 116. Accordingly, one or more of the symbolic links in the device stack (of the I/O device 116) may be moved from global namespace to a pre-determined namespace of the user session. Furthermore, the third-party kernel filter driver may block other user sessions, for example, I/O requests of the other user sessions, operating in the VM OS from accessing the device stack. As such, the I/O device 116 may only be accessible by the current user or the current user-session.

In particular embodiments, I/O device 116 may be an SLR-enabled I/O device that may include a single device class stack. As an example and not by way of limitation, an SLR-enabled printer may be associated with a printer device driver stack or a printer class stack (e.g. WINDOWS Printer Class). As such, the third-party kernel filter driver may only handle the printer device driver stack. Herein, reference to a third-party kernel filter driver may encompass an SLR filter driver, or vice-versa, where appropriate. Herein, reference to a device class stack may encompass a device driver stack, or vice-versa, where appropriate. In particular embodiments, an SLR-enabled I/O device may have two or more device driver stacks.

Figure 3:
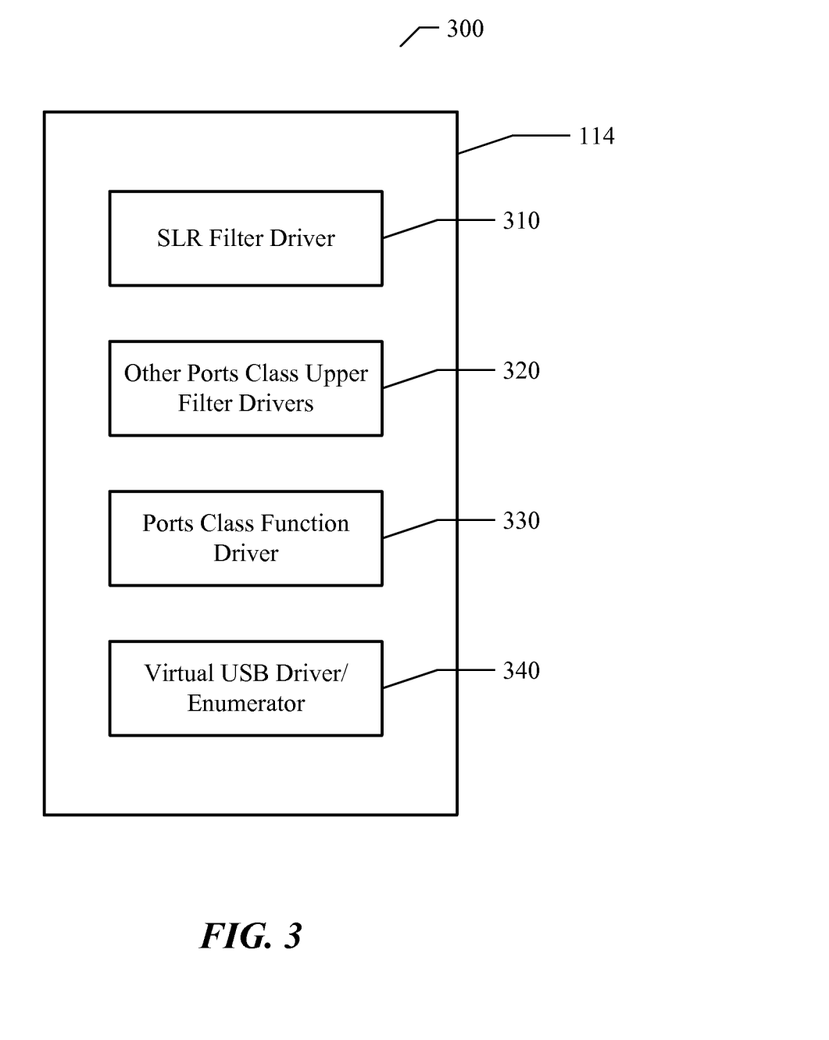
FIG. 3 is an example of selected elements of a driver for implementing an embodiment of the present invention.

FIG. 3 illustrates example components of an I/O driver 114. In particular embodiments, an I/O driver 114 may comprise an SLR filter driver 310, other ports class upper filter drivers 320, ports class function driver 330, and virtual USB driver/enumerator 340 and any other components known to one of ordinary skill in the art. In other embodiments, I/O driver 114 may not include other ports class upper filter drivers 320. In a particular embodiment, the virtual USB driver 340 is a Dell Wyse Virtual USB driver. One of ordinary skill in the art would understand that virtual USB driver 340 may be any virtual USB driver. When a notification is received that an I/O device 116 has been connected to a client 220, the virtual USB driver 340 creates a virtual USB device 260 with the same properties as the associated real I/O device (for example, I/O device 116.) For example, if a printer is connected to the parallel port of client 220, the virtual USB driver 340 will create a virtual USB printer with the same properties that the local printer has that is coupled to client 220. A symbolic link in global namespace, that is associated with the virtual USB device 260, will also be created by ports class function driver 330.

The ports class function driver 330 may, for example, be a port class function driver for a serial port, a parallel port, or any combination thereof. The ports class function driver 330 handles serial port or parallel port functionalities for any given request by an application attempting to utilize the functionalities of the serial port or parallel port. In a particular embodiment, the ports class function driver 330 attempts to execute the functionality associated with the properties of the virtual USB device 260 using the appropriate protocol for the I/O device 116 that is associated with the virtual USB device 260. For example, if the I/O device 116 is coupled to the serial port of client 220, the ports class function driver 330 will attempt to establish a connection using a serial port protocol. In another example, I/O device 116 may be a credit card swiping machine that is coupled to a serial port of a remote computer, client 220. The virtual USB driver 340 creates a virtual USB credit card swiping device (for example, virtual USB device 260) that corresponds to the credit card swiping machine coupled to the remote computer. The ports class function driver 330 may read data from the virtual USB credit card swiping device to obtain, for example, the credit card data. The ports class function driver may also write data to the virtual USB credit card swiping device. The functionality executed by the ports class function driver 330 may be based, at least in part, on the functionality of the I/O device 116/virtual USB device 260 and the associated I/O driver 114.

In a particular embodiment, the other ports class upper filter driver 320 may include one or more third-party drivers. For example, a vendor may provide a driver that permits a certain port to operate in an optimized, more robust, power-saving, or other mode known to one of ordinary skill in the art. In a particular embodiment the I/O driver 114 may not include an other ports class upper filter driver 320. The SLR filter driver 310 provides additional functionality on top of the other ports class upper filter driver 320. In a particular embodiment, the SLR filter driver 310 is a Dell WYSE SLR filter driver, for example, tsrest.sys. One of ordinary skill in the art would understand that SLR filter driver 310 may be any SLR filter driver. The SLR filter driver 310 restricts access (provides session level restriction) to the virtual USB device 260 to the user-session associated with the client 220 (the remote computer coupled to the I/O device 116) by replacing the global namespace symbolic link with a port name symbolic link in the user's user-session namespace as discussed with respect to FIG. 4 and FIG. 5. Thus, the SLR filter driver 310 coordinates with the ports class function driver 330 and other ports class filter drivers 320 to create disjoint port names for the I/O devices 116 coupled to the client devices 220 in a multi-user network environment 200.

For example, when user "A" couples one USB-to-serial device and one USB-to-parallel device, the port names "COM1" and "LPT1" may be assigned, respectively, in the user "A's" user-session namespace specifically such that "COM1" and "LPT1" refer only to user "A" coupled devices. Likewise, when user "B" couples one USB-to-serial device and one USB-to-parallel device, the port names "COM1" and "LPT1" may be assigned, respectively, in the user "B's" user-session namespace specifically such that "COM1" and "LPT1" refer only to user "B" coupled devices. Thus, the port names "COM1" and "LPT1" are disjoint in that they are isolated to a specific user-session. In this way every user in the multi-user network environment 200 will have access to port names well within the accessible range for each user's applications independent of any remoting protocols, such as, remote desktop protocol (RDP), independent computing architecture (ICA), personal computer over Internet protocol (PCoIP), or any other protocols known to one of ordinary skill in the art.

Figure 4:
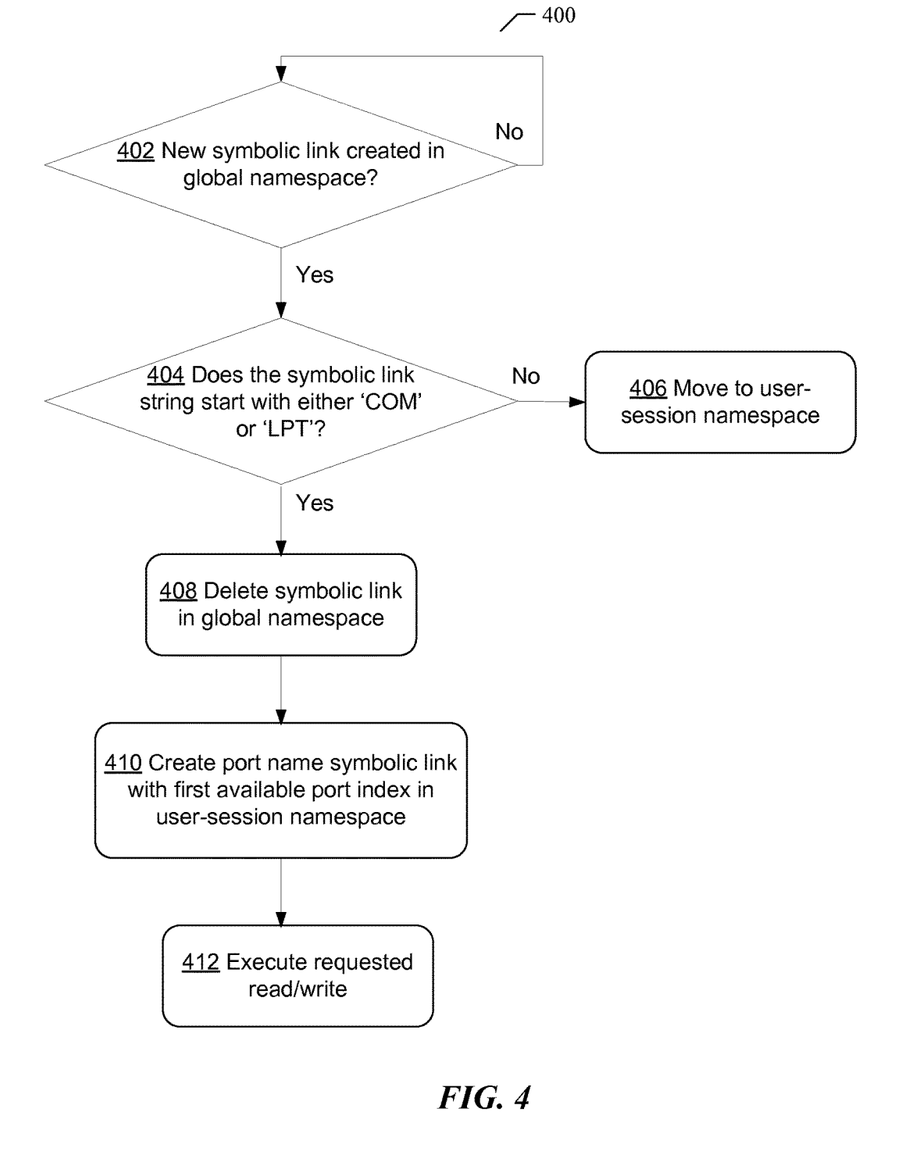
FIG. 4 is an example of a method for providing protocol independent disjoint port names.

FIG. 4 illustrates an example method to implement protocol independent disjoint port names by the SLR filter driver 310. Generally at 400, a method is provided for session level restriction for an I/O device 116 coupled to a port of client 220. When SLR for ports class is enabled, access to an I/O device 116 is restricted by deleting the symbolic link created for the I/O device 116 in global namespace and creating the same symbolic link in user-session namespace. In particular embodiments, the I/O device 116 may be any I/O device as discussed above. In a multi-user environment, such as network environment 200, the available port names for a given client 220 or a server 240 may be exhausted by multiple users connecting multiple I/O devices 116. Users may be remote users, administrators, local users or any other type of user known to one or ordinary skill in the art. When subsequent users attempt to connect additional I/O devices 116, the connection requests may fail if available port names have been exhausted. For example, a legacy information handling system 120 may only permit a total of eight I/O devices 116 and thus may be limited to COM 1 through COM 8 or LPT 1 through LPT 8, or any combination thereof. In a multi-user network environment 200, the port names may exceed the number permitted by the client device 220. For example, server 240 may receive from each of three different users on three different clients 220 requests for connection to three unique I/O devices 116. In this example, one client 220 will receive a port name, such as COM 9, that exceeds that allowable by the respective client device 220 even though the number of actual I/O devices does not exceed the maximum number allowable I/O devices. Once the available port numbers is reached, the user will not be permitted to access any additional I/O devices. FIG. 4 at 400 illustrates a method to allow each user access to the permissible number of I/O devices 116 by providing SLR without being compromised by the connections of other users.

At step 402 of FIG. 2, it is determined if a new symbolic link has been created for a newly created virtual USB device 260 which corresponds to an I/O device 116 coupled to a client 220. The method at 400 continuously monitors for the creation of a symbolic link. For example, as shown in step 402, the method loops back to step 402 if no symbolic link has been created. A symbolic link is created when a notification is sent to I/O driver 114 which creates a symbolic link as described with respect to FIG. 3. If a symbolic link has been created, then at step 404 it is determined whether the symbolic link string associated with the symbolic link begins with a specified port name prefix. For example, it may be determined at step 404 whether the symbolic link string begins with a prefix of either 'COM' or 'LPT' which indicates that I/O device 116 is connected to a serial port or a parallel port, respectively. If such strings are not found, then at step 406 the symbolic link in global namespace is moved to user-session namespace. That is, the symbolic link in global namespace is deleted and the same symbolic link is created in user-session namespace. If either of the strings are found, then at step 408 the symbolic link created in global namespace is deleted freeing the associated port index in the global namespace. Next at step 410, a port name symbolic link is created in the user namespace based, at least in part, on the symbolic link string and the first available port index in the user-session namespace. This port name symbolic link replaces the symbolic link deleted in global namespace such that the user would access the virtual USB device 260 via the port name symbolic link instead of using the global namespace symbolic link. At step 412, any read/write operations requested by an application may be executed. The method shown at 400 may be continuously implemented according to one or more parameters or settings of the operating system, one or more interrupts, threads, or other processes known to one of ordinary skill in the art.

Figure 5:
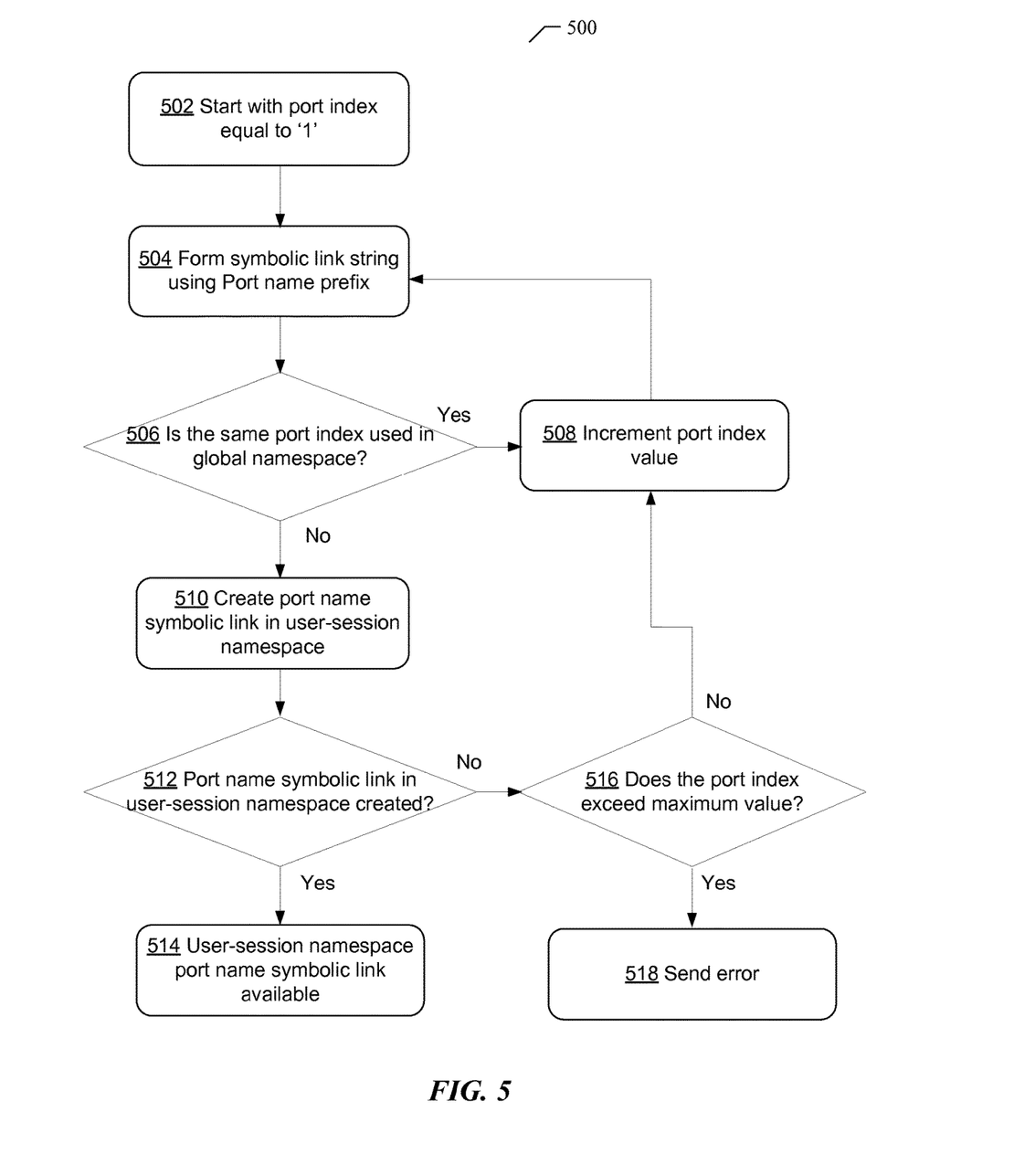
FIG. 5 is an example of a method for creating a disjoint port name (symbolic link) in user-session namespace.

FIG. 5 illustrates an example method of creating a disjoint port name (symbolic link) in a user session namespace 500 by the SLR filter driver 310. In a particular embodiment, to provide the maximum number of symbolic links for global namespace and user-session namespace, the method begins at step 502 with a port index of 1. One of ordinary skill in the art would understand that the port index may be set to any number appropriate for the particular network environment 200. For example, if port index numbers 1 through 3 are previously assigned for other purposes the port index of step 502 may be set to 4.

Next, at step 504, the symbolic link string is formed (the string used in step 404 of FIG. 4) using the port name prefix. In one embodiment, the port name prefix may be "COM" if the symbolic link corresponds to an I/O device 116 connected to a serial port of client 220. In another embodiment, the port name prefix may be "LPT" if the symbolic link corresponds to an I/O device 116 connected to a parallel port of client 220. Next, it is determined at step 506 if the currently available port index in the user-session namespace is currently used in global namespace. If the currently available port index is currently used in global namespace, then at step 508 the port index value is incremented to avoid any conflicts and the method continues at step 504. For example, if the symbolic link string in the user-session namespace is the same as the symbolic link string in global namespace then Windows APIs would only be able to use one to access one of them creating a conflict as to which symbolic link string should be used by the API. Generally, the symbolic link string in global namespace takes priority. If the currently available port index in the user-session namespace is not currently used in global namespace, then at step 510 a port name symbolic link is created in the user-session namespace.

Next, it is determined if the port name symbolic link was successfully created in the user-session namespace at step 512. If it was not successfully created then at step 516 it is determined if the port index in the user-session namespace exceeds the port index maximum threshold value for the server 240. The port index maximum threshold value may be set by a system administrator, by the operating system, or in any other manner known to one of ordinary skill in the art. In one embodiment, the port index maximum threshold value may be set to 256 providing a range of port index values of 1 through 256. If the port index in user-session namespace does not exceed the port index maximum threshold then the method continues at step 508. If the port index in user-session namespace does exceed the port index maximum threshold, then at step 518 an error is sent. In a particular embodiment, an error is sent to the operating system to indicate that a port name symbolic link in the user-session namespace could not be created based, at least in part, on the port index value for the port name symbolic link exceeding the port index maximum threshold value. In a particular embodiment, an error may be sent to the SLR filter driver 510.

If it is determined that the port name symbolic link in the user-session namespace was created successfully in step 512, then in step 514 the port name symbolic link created in the user-session namespace for the virtual USB device 260 is made available for access by one or more of the user's applications.

In one embodiment the process of FIGS. 4 and 5 may be implemented on the information handling system of FIG. 1 and as further illustrated in FIG. 2.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   enabling a session level restriction (SLR);
   receiving a request from a first user of a first client to connect to a first input/output (I/O) device coupled to the first client;
   creating a first global namespace symbolic link in global namespace associated with a first virtual USB device, wherein the first virtual USB device is associated with the first I/O device;
   determining if the first global namespace symbolic link is associated with a port of the first client;
   when the first global namespace symbolic link is determined to be associated with the port of the first client, deleting the first global namespace symbolic link in global namespace and creating a first port name symbolic link in a first user-session namespace associated with the first user based, at least in part, on a first available port index in the first user-session namespace, wherein the first port name symbolic link replaces the deleted first global namespace symbolic link and wherein access to the first port name symbolic link is restricted to the first user of the first client; and
   when the first global namespace symbolic link is determined not to be associated with the port of the first client, moving the first global namespace symbolic link to a user-session namespace.

2. The method of claim 1, further comprising:
   receiving a request from a second user of a second client to connect to a second I/O device coupled to the second client;
   creating a second global namespace symbolic link in global namespace associated with a second virtual USB devices, wherein the second virtual USB device corresponds to the second I/O device;
   determining if the second global namespace symbolic link is associated with a port of the second client;
   deleting the second global namespace symbolic link in global namespace; and
   creating a second port name symbolic link in a second user-session namespace associated with the second user based, at least in part, on a second available port index in the second user-session namespace, wherein the second port name symbolic link replaces the deleted second global namespace symbolic link and wherein access to the second port name symbolic link is restricted to the second user of the second client.

3. The method of claim 2, wherein the first available port index in the first user-session namespace is the same as the second available port index in the second user-session namespace and wherein a first port name prefix associated with the first port name symbolic link is the same as a second port name prefix associated with the second port name symbolic link.

4. The method of claim 3, wherein the first port name prefix corresponds to one of a serial port or parallel port and wherein the second port name prefix corresponds to one of a serial port or a parallel port.

5. The method of claim 1, further comprising:
   sending an error notification if the first symbolic link for the first virtual USB device was not created.

6. The method of claim 1, further comprising:
   determining a current port index of the global namespace;
   determining if the first available port index in the first user-session namespace is the same as the current port index in global namespace; and
   incrementing the current port index if the first available port index in the first user-session namespace is the same as the current port index in global namespace.

7. The method of claim 6, further comprising:
   determining if the current port index exceeds a maximum threshold value; and
   sending an error notification if the current port index exceeds the maximum threshold value.

8. The method of claim 1, further comprising:
   determining if a first string associated with the first global namespace symbolic link begins with a port name prefix, wherein the port name prefix begins with one of "COM" or "LPT".

9. One or more computer-readable non-transitory storage media embodying one or more instructions that when executed:
   enable a session level restriction (SLR);
   receive a request from a first user of a first client to connect to a first input/output (I/O) device coupled to the first client;
   create a first global namespace symbolic link in global namespace associated with a first virtual USB device, wherein the first virtual USB device corresponds to the first I/O device;
   determine if the first global namespace symbolic link is associated with a port of the first client;
   when the first global namespace symbolic link is determined to be associated with the port of the first client, delete the first global namespace symbolic link in global namespace and create a first port name symbolic link in a first user-session namespace associated with the first user based, at least in part, on a first available port index in the first user-session namespace, wherein the first port name symbolic link replaces the deleted first global namespace symbolic link and wherein access to the first port name symbolic link is restricted to the first user of the first client; and
   when the first global namespace symbolic link is determined not to be associated with the port of the first client, move the first global namespace symbolic link to a user-session namespace.

10. The media embodying one or more instructions of claim 9, further operable when executed to:
    receiving a request from a second user of a second client to connect to a second I/O device coupled to the second client;
    creating a second global namespace symbolic link in global namespace associated with a second virtual USB devices, wherein the second virtual USB device corresponds to the second I/O device;
    determining if the second global namespace symbolic link is associated with a port of the second client; and
    deleting the second global namespace symbolic link in global namespace; and
    creating a second port name symbolic link in a second user-session namespace associated with the second user based, at least in part, on a second available port index in the second user-sesssion namespace, wherein the second port name symbolic link replaces the deleted second global namespace symbolic link and wherein access to the second port name symbolic link is restricted to the second user of the second client.

11. The media embodying one or more instructions of claim 10, wherein the first available port index in the first user-session namespace is the same as the second available port index in the second user-session namespace and wherein a first port name prefix associated with the first port name symbolic link is the same as a second port name prefix associated with the second port name symbolic link.

12. The media embodying one or more instructions of claim 9, wherein the first port name prefix corresponds to one of a serial port or parallel port and wherein the second port name prefix corresponds to one of a serial port or a parallel port.

13. The media embodying one or more instructions of claim 9, further operable when executed to:
send an error notification if the first symbolic link for the first virtual USB device was not created.

14. The media embodying one or more instructions of claim 13, further operable when executed to:
determine a current port index of the global namespace;
determine if the first available port index in the first user-session namespace is the same as the current port index in global namespace; and
increment the current port index if the first available port index in the first user-session namespace is the same as current port index in global namespace.

15. The media embodying one or more instructions of claim 9, further operable when executed to:
determine if the current port index exceeds a maximum threshold value; and
send an error notification if the current port index exceeds the maximum threshold value.

16. The media embodying one or more instructions of claim 15, further operable when executed to:
determine if a first string associated with the first global namespace symbolic link begins with a port name prefix, wherein the port name prefix begins with one of "COM" or "LPT".

17. An information handling system comprising:
one or more processors, wherein the one or more processors comprise hardware for executing one or more instructions;
a memory coupled to the processors; and
an input/output (I/O) driver in communication with the processors and the memory, wherein the I/O driver comprises:
a virtual universal serial bus (USB) driver, wherein the virtual USB driver creates a virtual USB device with the same one or more properties as an associated I/O device coupled to a first client;
a port class function driver, wherein the port class function driver executes one or more functionalities associated with the one or more properties of the virtual USB device; and
a session level restriction (SLR) filter driver, wherein when a first global namespace symbolic link is determined to be associated with a port of the first client, the SLR filter driver creates a port name symbolic link associated with the virtual USB device based, at least in part, on a first available port index in a user-session namespace and the SLR filter driver deletes a symbolic link in global namespace associated with the virtual USB device, and wherein when the first global namespace symbolic link is determined not to be associated with the port of the first client, the SLR filter driver moves the first global namespace symbolic link to a user-session namespace.

18. The information handling system of claim 17, further comprising:
one or more other ports class upper filter drivers, wherein the other ports class upper filter driver comprises one or more vendor specific drivers that provides one or more operating parameters for the virtual USB device.

19. The information handling system of claim 17, wherein a port name prefix associated with the first port name symbolic link corresponds to one of a serial port or parallel port.

20. The information handling system of claim 17, wherein the SLR filter driver further determines a current port index of the global namespace, determine if an available port index in the user-session namespace is the same as the current port index in global namespace, and increment the current port index if the available port index in the user-session namespace is the same as the current port index in global namespace.

* * * * *